US010037878B2

(12) United States Patent
Haase

(10) Patent No.: US 10,037,878 B2
(45) Date of Patent: Jul. 31, 2018

(54) BLANKING OUT OF PULSES IN PULSED LASERS FOR LDI MASS SPECTROMETERS

(71) Applicant: Bruker Daltonik GmbH, Bremen (DE)

(72) Inventor: Andreas Haase, Bremen (DE)

( * ) Notice: Subject to any disclaimer, the term of this patent is extended or adjusted under 35 U.S.C. 154(b) by 0 days.

(21) Appl. No.: 15/251,138

(22) Filed: Aug. 30, 2016

(65) Prior Publication Data
US 2017/0076932 A1    Mar. 16, 2017

(30) Foreign Application Priority Data

Sep. 14, 2015  (DE) .................. 10 2015 115 416

(51) Int. Cl.
| | |
|---|---|
| H01J 49/40 | (2006.01) |
| H01J 49/00 | (2006.01) |
| H01S 3/115 | (2006.01) |
| H01S 3/00 | (2006.01) |
| G02F 1/03 | (2006.01) |
| H01J 49/16 | (2006.01) |
| H01S 3/0941 | (2006.01) |
| H01S 3/10 | (2006.01) |
| G02F 1/35 | (2006.01) |

(52) U.S. Cl.
CPC .......... *H01J 49/403* (2013.01); *G02F 1/0311* (2013.01); *H01J 49/0027* (2013.01); *H01J 49/406* (2013.01); *H01S 3/0057* (2013.01); *H01S 3/115* (2013.01); *G02F 2001/354* (2013.01); *G02F 2001/3507* (2013.01); *H01J 49/164* (2013.01); *H01S 3/09415* (2013.01); *H01S 3/10061* (2013.01)

(58) Field of Classification Search
USPC ........................................ 250/282, 287, 288
See application file for complete search history.

(56) References Cited

U.S. PATENT DOCUMENTS

| | | | | |
|---|---|---|---|---|
| 4,975,918 A | * | 12/1990 | Morton ................. | H01S 3/0612 372/20 |
| 6,080,148 A | | 6/2000 | Damasco et al. | |
| 6,683,894 B1 | | 1/2004 | Lee et al. | |
| 7,408,152 B2 | * | 8/2008 | Holle .................... | H01J 49/164 250/281 |

FOREIGN PATENT DOCUMENTS

| | | |
|---|---|---|
| DE | 19182124 T1 | 9/1999 |
| DE | 102012212672 A1 | 1/2014 |
| GB | 2422954 Y | 8/2006 |
| GB | 2468394 Y | 9/2010 |
| JP | 06334252 A1 | 12/1994 |
| WO | 9822185 Y | 5/1998 |

* cited by examiner

*Primary Examiner* — Phillip A Johnston
(74) *Attorney, Agent, or Firm* — Benoît & Côté Inc.

(57) ABSTRACT

The invention relates to optically pumped and pulsed solid-state lasers which are used in mass spectrometers in particular for ionization by matrix-assisted laser desorption (MALDI) and which operate at pulse frequencies of up to 10 kilohertz or even higher. The invention proposes that, instead of interrupting the clocked sequence of the laser operation, individual light pulses or groups of light pulses are blanked out so that subsequent light pulses do not have a higher energy density, in accordance with the requirements for LDI processes. Methods and devices for the blanking out of light pulses are provided which are, in particular, low cost and considerably less complex than other methods.

14 Claims, 2 Drawing Sheets

BLANKING OUT OF PULSES IN PULSED LASERS FOR LDI MASS SPECTROMETERS

BACKGROUND OF THE INVENTION

Field of the Invention

The invention relates to optically pumped solid-state pulse lasers which are used in mass spectrometers for ionization by laser desorption, particularly matrix-assisted laser desorption (MALDI). It particularly relates to the blanking out of individual laser pulses or groups of laser pulses, giving special consideration to the requirements of pulsed ionization processes such as the MALDI process.

The invention provides a low-cost, non-complex method whereby individual light pulses or groups of light pulses can be blanked out without subsequent light pulses having a higher energy density as a result of the previous blanking out.

Description of the Related Art

An important type of ionization for biomolecules is ionization by matrix-assisted laser desorption (MALDI), which was developed by M. Karas and K. Hillenkamp about twenty years ago. MALDI ablates and ionizes the analyte molecules, preferably biomolecules, which are contained in highly diluted form in a mixture with molecules of a matrix substance in samples on sample supports, by bombarding them with pulses of laser light, usually UV laser light. Nitrogen lasers were previously the main type of laser for this task. Nowadays, however, solid-state lasers are used because they have a far longer lifetime and higher pulse frequencies. The lasers usually used have neodymium-doped crystals and a tripling of the photon energy by non-linear crystals (e.g. with a target wavelength of 355 nanometers).

Nowadays, the ions which are created in the plasma of each such pulse of laser light are primarily accelerated in specially designed MALDI time-of-flight mass spectrometers (MALDI-TOF-MS) with between 20 and 30 kilovolts and axially injected into a flight path. After passing through the flight path, they encounter an ion measuring system, which measures the mass-dependent arrival time of the ions and their quantity, and then records the digitized measurements in the form of a time-of-flight spectrum. In the past, repetition frequencies of the laser light pulses of between 20 and 60 hertz were used for nitrogen lasers. Solid-state lasers have been used with repetition rates of up to 2,000 light pulses per second. Recently, the applicant for this disclosure developed a MALDI-TOF mass spectrometer with light pulse and spectral acquisition frequencies of 10 kilohertz.

In order to avoid saturation effects of the ion detection, care has to be taken that each pulse of laser light does not produce too many ions, for example only a few thousand per pulse at most. A few hundred to a few thousand individual spectra are therefore summed for a time-of-flight spectrum. The mass spectra can achieve mass resolutions of $R=m/\Delta m=80,000$ and more nowadays, where $\Delta m$ is the width of the ion peak at half height.

This mass resolution is achieved only if the energy density of the laser light pulses is correctly adjusted and as constant as possible from shot to shot, however. The properties of the plasma produced by a laser pulse have a strongly nonlinear dependence on the energy density in the pulse of laser light; the optimum setting of the MALDI conditions for full utilization of the measurement range therefore requires that the energy density of the laser light pulses has unusually high constancy. According to the literature, the ion yield is roughly proportional to the sixth or even seventh power of the energy, see, for instance, the review article "The Desorption Process in MALDI" by Klaus Dreisewerd (Chem. Rev. 2003, 103, 395-425). Changing the energy of the laser light pulse by only one percent is enough to change the ion yield by some six to seven percent; something similar applies for other plasma parameters also.

The energy also determines the pressure in the plasma cloud that is produced in every laser shot, for example; and the pressure-dependent expansion of this plasma determines the initial velocity distribution of the ions. As those skilled in the art of MALDI know, this velocity distribution must be accurately focused in time by selecting a suitable delay before the acceleration into the flight path (delayed extraction) and a suitable profile of the accelerating voltage. Even a slight change in the energy becomes noticeable through a measurable deterioration of the mass resolution.

If the series of laser light pulses has to be interrupted at high pulse sequence frequencies, for example because a target to be aimed at on a sample support has to be moved and spatially realigned, this can lead to a problem with the constancy of the energy density. If the outpulsing, and thus the reduction of the stored inversion, is simply interrupted in time, the continued pumping of the laser crystals can lead to an increase in the population of the upper energy state and thus to a strong increase in the energy in the next pulse of laser light. An extremely harmful multiplication of the energy density of the next laser pulse can result easily here. In principle, it is possible to control the pumping process, but this proves to be fundamentally disadvantageous for the service life and efficiency of the pump diode for high pulse frequencies of 10 kilohertz, for example.

FIG. 1 schematically illustrates the underlying problem. A series of uniform pulses of laser light (a) to (k) is interrupted at position (f) (broken line). Pulse (G), which follows the omitted light pulse (f), has increased energy compared to the other pulses of the series, before the value levels off again to roughly the previous value as from pulse (h) on.

Another possible way to avoid energy increase relates to the temporally fast blanking out of laser pulses by mechanical arrangements and/or electro-optical methods (so-called "pulse pickers") after the laser beam is generated. Mechanical arrangements are not fast enough, however, especially for the kHz regime of operation; electro-optical methods, on the other hand, require a lot of space and are very costly, comparable with the cost of the laser system itself, which makes this kind of solution fundamentally uneconomical.

The acquisition technique of pulsed ion sources such as MALDI ion sources requires that one or more laser pulses be sometimes omitted, however. For example, when changing from one individual sample to the next on a sample support that holds separate samples, it is necessary to omit several laser pulses in order to avoid obtaining mass spectra of the bare sample support or even damaging the sample support. In imaging mass spectrometry which requires surfaces of thin tissue sections to be scanned, laser pulses must be omitted when one raster line of the image has been scanned and it is necessary to start again from the beginning with the next raster line. The subsequent laser pulse in each case should not show an increase in energy significantly greater than one percent, however. Those of skill in the art will acknowledge that this requirement distinguishes MALDI from other laser applications.

In view of the foregoing, there is a need to provide a method which allows the clocked sequence of laser pulses onto a sample support for ionization by laser desorption to be interrupted for any chosen number of pulses without the first laser pulse onto the sample after the interruption having a disadvantageously increased energy density. Furthermore, there is a need to provide a device which makes such an operating mode easy and inexpensive to achieve.

SUMMARY OF THE INVENTION

The actual laser resonator (optical cavity) consists of at least a laser crystal, which is pumped optically from outside, a high-reflectivity mirror for the laser wavelength (e.g. 1064 nanometers) at one end of the optical cavity, a partially transparent mirror at the other end, a polarization filter and a switchable polarization rotator which allows the performance of the cavity to be varied. Optical pumping generates a population excess at an upper energy level in the laser crystal. If the polarization rotator is switched in such a way that it rotates the polarization of the photons to the transmitting orientation of the polarization filter, the stimulated emission noticeably begins to start up, and the emission is very quickly amplified exponentially in fractions of nanoseconds until the population excess of the upper laser level is nearly exhausted. In the case of the Q-switch generally used in the "On Q-switch" operating mode, the switchable polarization rotator preferably consists of a switchable Pockels cell for a $\lambda/4$ rotation per passage and a $\lambda/4$ wave plate. The purpose of the $\lambda/4$ wave plate is to block the cavity (i.e. to prevent the stimulated emission) when no voltage is applied to the Pockels cell.

The invention exploits the fact that the laser light which exits the cavity is linearly polarized. The invention consists basically in allowing the laser to run without interruption, in the infrared for example, at preselected clock rate and preselected energy, and to carry out the interruptions of the sample irradiation by means of a polarization rotator which can be rapidly electrically switched and which changes the direction of polarization. Rapidly switchable here means right down to the regime of only a few nanoseconds.

In particular, it is possible to use a combination of a switchable Pockels cell for a $\lambda/4$ rotation and a $\lambda/4$ wave plate in order to rapidly rotate the polarization plane through 90° by means of a switch-over. In conjunction with a polarization filter, which removes photons with rotated polarization plane, e.g. by reflection, the irradiation of the sample support can be interrupted as desired. The reflected-out laser light of the blanked-out pulse can be caught in a special absorber and destroyed.

It is also possible to exploit the fact that the crystals which are optionally used for the multiplication, for example doubling and tripling, of the laser energy require photons of a specific polarization in order to produce light radiation of a target energy, for example in the ultraviolet. If the polarization plane of the laser light is rotated, the light which is initially infrared, for example, passes through the crystal undisturbed without conversion. A downstream mirror which deflects only the light of the target energy, for example in the ultraviolet, simply allows the infrared laser light to pass and enter an absorber, in which the energy of the laser light is destroyed.

In a preferred embodiment, the Pockels cell in the optical cavity can itself be used to rotate the polarization plane, thus creating a low-cost, non-complex system which can achieve the low-wear blanking out of light pulses which does not degrade the equipment. In a usual arrangement of the elements in the cavity, laser crystal→Pockels cell→wave plate→polarization filter, this is not possible, however, because the polarization filter at the end dictates the polarization of the light exiting the cavity. This is usually desirable for the application of a subsequent frequency conversion because the direction of polarization is then perfectly matched to the nonlinear crystals. If the order is changed to laser crystal→polarization filter→Pockels cell→wave plate, for example, the polarization of the exiting light can be changed. If the high voltage applied to the Pockels cell is rotated in its polarization, a laser beam whose polarization plane is rotated through 90° exits the optical cavity. This laser beam can then pass through the polarization-sensitive multiplier crystals, e.g. doubling and tripling crystals, without conversion, for example, and be caught and destroyed in an absorber, as described above.

DETAILED DESCRIPTION

While the invention has been shown and described with reference to a number of different embodiments thereof, it will be recognized by those of skill in the art that various changes in form and detail may be made herein without departing from the scope of the invention as defined by the appended claims.

In today's solid-state lasers, a laser crystal is usually pumped with light from a diode-pumped laser as the pump light source; in conventional four-level lasers, this causes the electrons to be raised from a ground state into a high-energy state, which usually has a band-like level. From there they relax in a very short time of mere nanoseconds by non-radiative transitions to a precisely defined state of somewhat lower energy (upper laser level). They remain in this state for a relatively long time because, in the specially selected crystals, the transition to even lower levels is forbidden by the rules of quantum optics. In conventional Nd:YAG crystals, the relaxation time of this state amounts to some 230 microseconds. From here, a transition into the lower laser energy level can occur by stimulated or spontaneous light emission. The transition from the lower laser level into the ground state occurs in a very short time. An inversion state between the lower and upper laser level can thus be achieved relatively easily by optical pumping.

In the present arrangement of a polarization filter adjacent to the laser crystal, it is possible to use not only Nd:YAG crystals but also other naturally birefringent laser crystals, whose amplification factor ("gain") depends on the polarization of the light.

Figure 1:
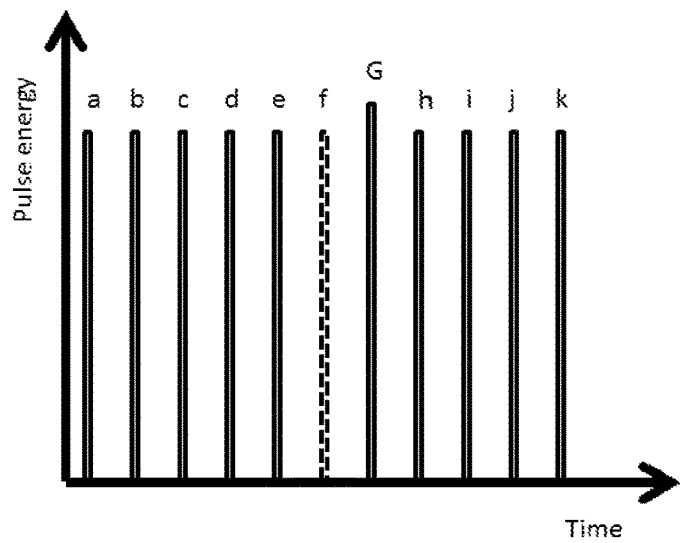
FIG. 1 shows a schematic diagram of a temporal series of laser light pulses on an energy scale with the effect of the increased energy after a light pulse has been omitted.
Figure 2:
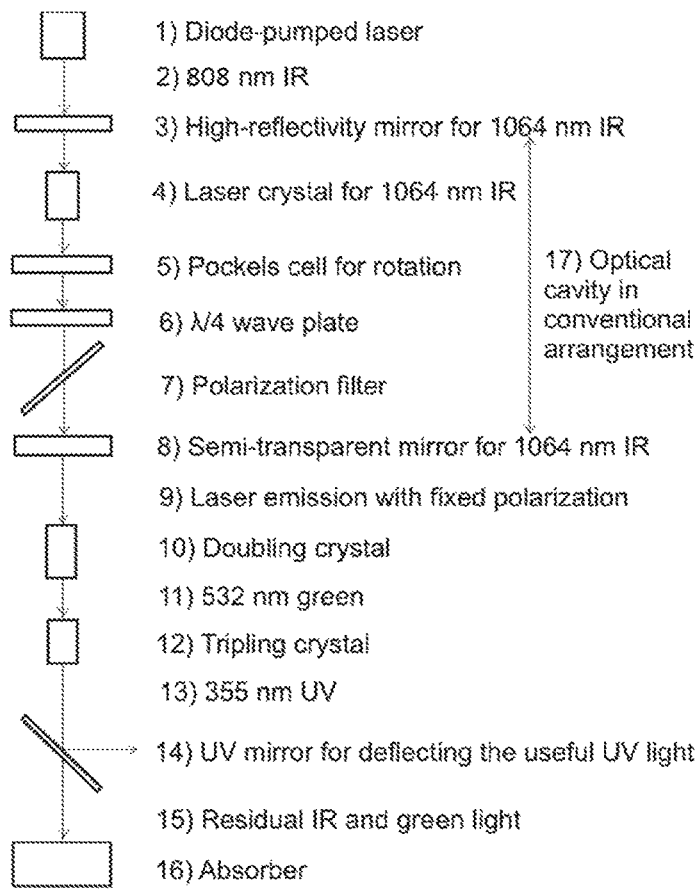
FIG. 2 shows the arrangement of a conventional pulsed laser to generate UV light pulses. A diode-pumped laser (1) emitting 808 nanometer IR light pumps the laser crystal (4). The mirror (3) is highly transparent to 808 nanometer IR light and highly reflective for the 1064 nanometer IR light of the laser crystal (4). The Pockels cell (5) and the $\lambda/4$ wave plate (6), which together form a switchable polarization rotator, and a polarization filter (7) are also contained in the optical cavity (17), which is terminated by the mirror (8), which is semi-transparent. If the polarization rotator (5, 6) is switched so that the polarization coincides with the transmission direction of the polarization filter (7), light can pass to and from unhindered between the mirrors (3) and (8), and the light amplification process commences. Its light intensity very rapidly increases exponentially in fractions of nanoseconds until the population excess in the upper level of the laser crystal (4) is exhausted. The IR light pulse of a few nanoseconds duration exiting through the semi-transparent mirror (8) is linearly polarized in a fixed direction. In the doubling crystal (10), green photons are produced from two IR photons in each case; in the tripling crystal, (12) UV photons are produced from IR photons and green photons. The UV mirror (14) deflects the useful UV radiation for further use; the remaining IR light and the remaining green light (15) are caught in an absorber (16) and destroyed.

As depicted in FIG. 2 for a conventional arrangement, the actual optical cavity (17) consists of at least a laser crystal (4), which is pumped optically from outside by pump diodes (1); a mirror (3) which has a high reflectivity for the laser wavelength, e.g. 1064 nanometers, but is highly transparent for the pump wavelength of, for example, 808 nanometers, at one end of the optical cavity; a mirror (8) which is semi-transparent here at the other end; a polarization filter (7) and a switchable polarization rotator (5, 6), which can be used to initiate the light amplification of the laser. The optical pumping generates a population excess in the upper energy level in the laser crystal. If the polarization rotator (5, 6) is switched at the start of the emission so that it generates photons of the same linear polarization during the double passage as the polarization filter (7) requires for a transmission, light generation starts and undergoes very rapid exponential amplification until the population excess of the upper laser level is exhausted after a few nanoseconds. The switchable polarization rotator (5, 6) usually consists of a switchable Pockels cell (5) for a λ/4 rotation of linearly polarized light to circularly polarized light, and a λ/4 wave plate (6) for a further rotation of circularly to linearly polarized light, as shown.

Applying a high voltage makes the crystal of the Pockels cell (5) so birefringent that it becomes a λ/4 wave plate, given the correct voltage and orientation. Together with the additional λ/4 wave plate, a polarization rotator is created whose polarization plane can be rotated through 90° (switch-over) by reversing the polarity (+/−) of the high voltage applied to the Pockels cell.

In conventional arrangements, as shown in FIG. 2, the polarization filter (7) is located directly in front of the semi-transparent mirror (8) at the end of the cavity (17). This causes the optical cavity (17) to emit a light beam (9) with a fixed direction of polarization. This is desirable for conventional applications, since doubling crystal (10) and tripling crystal (12) require light beams with a fixed direction of polarization.

The invention now exploits the fact that the laser light which exits the cavity (17) is polarized. The invention consists in allowing the laser with its cavity to run uninterrupted at a set clock rate, and interrupting the pulsed sample irradiation by means of an electrical switch-over of the polarization rotator in conjunction with a polarization-sensitive component such as a polarization filter or a polarization-sensitive multiplier crystal.

In particular, it is possible to rotate the polarization plane through 90° by means of an electrical switch-over by using a combination of a switchable Pockels cell, which produces circularly polarized light from linearly polarized light at a precisely fixed high voltage by means of the birefringency generated, and a birefringent λ/4 wave plate which produces linearly polarized light from the circularly polarized light again. Depending on the polarity (+/−) of the high voltage applied to the Pockels cell, the direction of the linear polarization can be switched between the two states which differ by 90° (vertical or horizontal polarization, for example). In conjunction with a polarization filter in the form of a mirror, which removes photons with a rotated polarization plane by reflection, the irradiation of the sample support can be interrupted as desired. The reflected-away laser light of a pulse or group of pulses can be caught in a special absorber and destroyed. Such an arrangement of polarization rotator and polarization filter can also be installed between the semi-transparent mirror (8) of the optical cavity and the doubling crystal (10) as the first multiplier crystal, for example (not shown).

It is also particularly possible to exploit the fact that the crystals (10) and (12) which are (optionally) used for the multiplication, for example doubling and tripling, of the laser energy require photons of a specific polarization, i.e. the crystals themselves represent a polarization-sensitive component. In other words, if photons are incident on a multiplier crystal and if the polarization of these photons coincides with the preferred direction (or active direction) of the multiplier crystal, the photon energy is converted. If, however, the incoming photons have a linear polarization which coincides with an inactive direction of the multiplier crystal, they pass largely unhindered through the crystal without interacting with it. If the polarization plane of the laser light is rotated by an upstream polarization rotator, comprised of Pockels cell and wave plate, for example, the low-energy infrared light passes undisturbed through the doubling and tripling crystals (10) and (12) without being converted. A downstream UV mirror (14), which deflects only the UV light of higher energy, then allows the infrared laser light to pass into an absorber (16), in which the energy of the laser light is destroyed.

In a particularly preferred embodiment, the Pockels cell (5) in the optical cavity can itself be used to rotate the polarization plane. In the usual sequence of the elements in the optical cavity (17) of FIG. 2, i.e. laser crystal (4)→Pockels cell (5)→wave plate (6)→polarization filter (7), this is not possible, however, because the polarization filter (7) at the end dictates the polarization direction of the emerging light, which is usually desirable for the applications outside the field of pulsed ionization in mass spectrometry. If the order is changed, however, as shown by way of example in FIG. 3, namely: to laser crystal (4)→polarization filter (7)→Pockels cell (5)→wave plate (6), then the polarization of the emerging light can be changed (19) without affecting the optical pump process, the production of the population inversion or the stimulated emission of radiation. If the polarity (+/−) of the high voltage pulse applied to the Pockels cell (5) to start the stimulated emission is reversed here, a laser light pulse whose polarization plane is rotated through 90° exits the optical cavity because Pockels cell and wave plate form a λ/2 wave plate. This pulse of laser light then passes without conversion through the doubling and tripling crystals (10) and (12) and, as described above, can be destroyed in the absorber (16) because it passes straight through the UV mirror (14).

It is therefore another aspect of the invention to introduce a special arrangement of the polarization rotator (5, 6) and the polarization filter (7) in the optical cavity (18) in order to blank out laser pulses, according to principles of the invention. An additional requirement is to use a high voltage generator which can supply both positive and negative high-voltage pulses of reproducibly adjustable voltage to switch the directions of polarization (three state generator), as opposed to generators which can be switched merely between two states, namely one fixed polarization state brought about by a fixed polarity voltage pulse (+ or −) and an idling state during which the laser crystal continues being pumped.

The operating method and the embodiments of the laser are presented in greatly simplified form here. In reality, technical challenges arise which must be taken into account. For example, the laser crystal (4) heats up during optical pumping and forms a thermal lens. This depends on the pumping power used. After being emitted from the optical cavity, the IR beam (low energy) must therefore be adjustably parallelized again by means of a lens and brought to the right diameter for the crystals (10) and (12). Lateral aberrations also occur which must be compensated for the subsequent frequency conversion. These and further requirements are, however, of no particular importance for the invention and its embodiments. Those of skill in this field will routinely know how to deal with them.

The energy of a UV light pulse amounts to around 100 microjoules, although only between a few nanojoules and one hundred nanojoules are usually necessary for the irradiation of the sample. The high initial energy is, however, required in order to cover a large range of samples and applications. The energy of the light pulses is therefore reduced very precisely by four to five orders of magnitude. Here also, care must be taken that the energy of the laser light pulse remains as constant as possible from pulse to pulse. Perfect constancy cannot be achieved, however, since statistical fluctuations in the energy also result from the laser process itself, which also affect the MALDI analytical method. These statistical energy fluctuations are caused by statistical processes at the start of the stimulated emission. After switching the polarization rotator, individual photons which happen to have the correct direction start the emission process in a statistical way. The energy fluctuations are amplified even further by the nonlinear conversion process of the IR wavelength into the UV range. The statistical fluctuations of the energy as a result of these processes typically amount to between 1.5 and 2.5 percent standard deviation. These fluctuations can be reduced to about 0.4 percent by certain operating methods which make the start of the stimulated emission more constant (for example "seeding", whereby the radiation of a laser serves as the input for an optical amplifier or another laser).

The invention relates to methods for the partially discontinuous (i.e. partially interrupted, pulsed) irradiation of a sample support in a mass spectrometer with light pulses for the ionization of samples on the sample support by laser desorption. A laser crystal, which is located in an optical cavity between a high-reflectivity mirror at one end and a mirror which partially transmits the original energy at the other end, sends out continuously uniform light pulses of an initial energy. A polarization rotator imparts a predefined polarization direction to the photons of the initial energy, after which the light pulses are guided to the sample support in order to desorb sample material there. The polarization rotator changes the polarization direction of the photons of the initial energy at certain times, so that individual laser light pulses of the initial energy, or groups thereof, are blanked out with the aid of a polarization-sensitive component and remain unused.

In various embodiments, the light pulses of the initial energy can be used directly for the irradiation of the samples. Applications of infrared MALDI, or IR MALDI, are known, for example. In alternative embodiments, however, when the photons of the initial energy exit the optical cavity, they can also be converted into photons of a target energy—which is higher than the initial energy—by multiplying the photon energy in at least one multiplier crystal. These photons can then be guided to the sample support. The target energy can be in the ultraviolet, for example.

The rapidly switchable polarization rotator can comprise a rapidly switchable Pockels cell and a $\lambda/4$ wave plate. The Pockels cell is preferably operated with a high voltage generator which controllably supplies both positive and negative high-voltage pulses of accurately reproducible voltage for changing the polarization directions. The polarization-sensitive component can comprise a polarization filter. It is preferable if the polarization filter is not positioned immediately adjacent to the partially transparent mirror.

In different embodiments, a polarization filter and a rapidly switchable polarization rotator for blanking out the light pulses can be positioned outside the optical cavity and between the partially transparent mirror and a first multiplier crystal. In alternative embodiments, however, it is also possible to use the Pockels cell and the $\lambda/4$ wave plate in the optical cavity as a rapidly switchable polarization rotator for the blanking out, in which case the usual arrangement of the optical elements in the optical cavity has to be changed so that the polarization filter is no longer positioned directly adjacent to the partially transparent mirror. The rapidly switchable polarization rotator requires a high voltage generator which can provide both negative and positive high-voltage pulses of reproducible voltage for the rapid switching of the directions of polarization.

The polarization-sensitive component can also comprise at least one multiplier crystal, which essentially operates only with light of the predefined direction of polarization when a laser light pulse of the target energy is to be sent onto a sample, and allows light of a different direction of polarization, for example rotated through 90°, to pass unchanged so that no frequency multiplication and no irradiation of the sample takes place.

A particularly preferred method uses the Pockels cell and the $\lambda/4$ wave plate in the optical cavity for rotating the direction of polarization, and the doubling and tripling crystals for blanking out the light pulses.

The ionization of the sample can particularly be achieved by matrix-assisted laser desorption (MALDI). The principles presented here are also applicable to other pulsed desorption-ionization methods, however. The laser pulse frequency can be set to between 1 hertz and 10 kilohertz, or even higher to several 10 kilohertz.

In particular, the invention comprises an optical cavity in which the polarization rotator, and not the polarization filter, as is usually the case, is positioned directly adjacent to the partially transparent mirror. For the operation of a Pockels cell, a high voltage generator which can supply both positive and negative high-voltage pulses of precisely reproducible voltage for switching the directions of polarization is preferred. It is also preferable if birefringent crystals can be used as laser crystals in the optical cavity.

Figure 3:
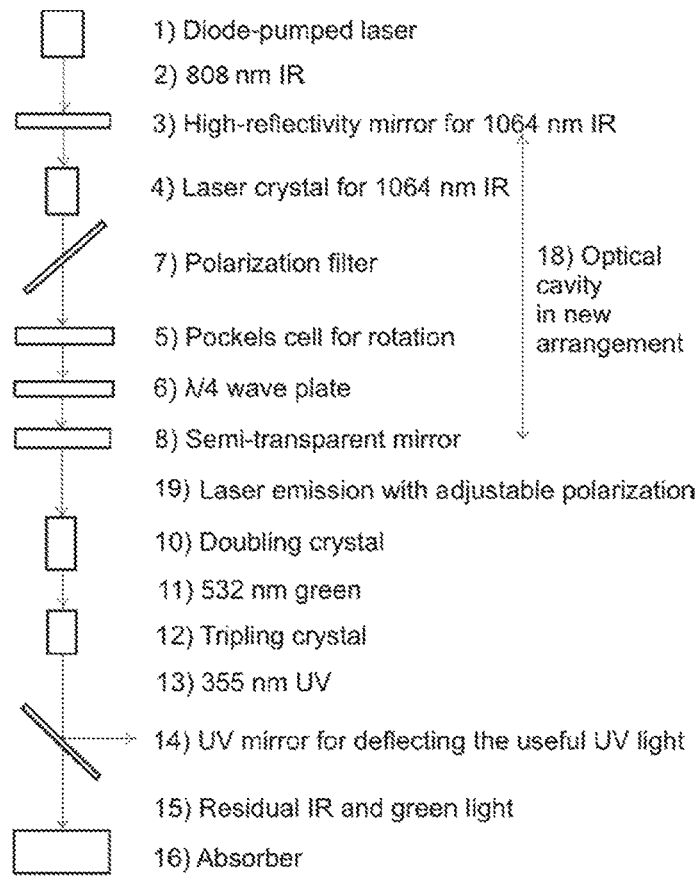
FIG. 3 illustrates the preferred arrangement in the optical cavity according to principles of the invention. The rearrangement of polarization filter (7) and polarization rotator (5, 6) means the orientation of the polarization of the emitted IR light (19) during the emission can be changed at will between two planes, for example so that the IR light passes through the doubling and tripling crystals (10) and (12) without frequency conversion, because the active direction of the multiplier crystals no longer coincides with the direction of polarization of the light, and is caught in the absorber (16), and destroyed.
Figure 4:
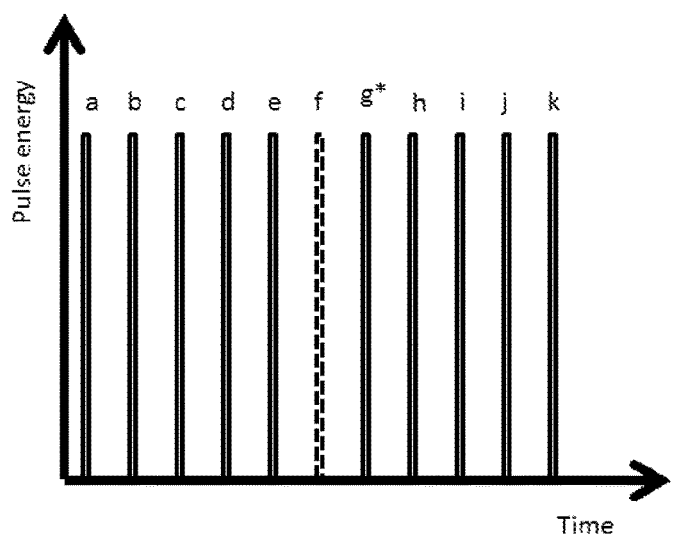
FIG. 4 is a schematic diagram similar to FIG. 1, but showing a situation in which the pulse energy homogeneity is maintained, also when individual or grouped pulses are blanked-out (partially discontinuous operation), by using the method described here and, if required, using the devices described here. The pulse (g*) after the omitted pulse (f) fits in well in the pulse series.

Particularly preferred is the use of a new optical cavity, as described above and explained by way of example using the embodiment from FIG. 3, in an ion source of a time-of-flight mass spectrometer which operates with ionization by matrix-assisted laser desorption (MALDI).

The invention has been described above with reference to a number of different embodiments thereof. It will be understood, however, that various aspects or details of the invention can be modified without deviating from the scope of the invention. In particular, measures disclosed in connection with different embodiments can be combined as desired if this appears feasible to a person skilled in the art. In addition, the above description serves only as an illustration of the invention and not as a limitation of the scope of protection, which is exclusively defined by the enclosed claims, taking into account any equivalents which may possibly exist.

The invention claimed is:

1. A method for the partially discontinuous irradiation of a sample support in a mass spectrometer with light pulses for ionization of samples on the sample support by laser desorption, in which continuously uniform light pulses of an initial energy are emitted from a laser crystal, which is located in an optical cavity between a high-reflectivity mirror at one end and a mirror at the other end which is partially transparent for the initial energy and through which light pulses exit the optical cavity, and where a polarization rotator imparts one of a plurality of predefined directions of polarization to photons of the initial energy, and operates in conjunction with a polarization sensitive component external to the optical cavity such that light pulses having a first polarization direction are guided to the sample support, while light pulses having a second polarization direction, different than the first polarization direction, are prevented from reaching the sample support.

2. The method according to claim 1, wherein, after exiting the optical cavity, the photons of the initial energy are converted into photons of a target energy, which is higher than the initial energy, by multiplying a photon energy in at least one multiplier crystal.

3. The method according to claim 2, wherein the polarization-sensitive component comprises said at least one multiplier crystal, which operates substantially only with the light pulses having the first polarization direction, and allows light having the second direction of polarization to pass unchanged so that no frequency multiplication takes place.

4. The method according to claim 1, wherein the polarization rotator comprises a Pockels cell and a λ/4 wave plate.

5. The method according to claim 4, wherein the Pockels cell is operated with a high voltage generator which controllably supplies both positive and negative high-voltage pulses of reproducible voltage for changing the directions of polarization.

6. The method according to claim 1, wherein the optical cavity further comprises a polarization filter.

7. The method according to claim 6, wherein the polarization filter is not positioned immediately adjacent to the partially transparent mirror.

8. The method according to claim 6, wherein the polarization filter and the polarization rotator are positioned in the optical cavity between the laser crystal and the partially transparent mirror.

9. The method according to claim 1, wherein matrix-assisted laser desorption (MALDI) is used for the ionization of the samples in the mass spectrometer.

10. The method according to claim 1, wherein a laser pulse frequency is set to between 1 hertz and 10 kilohertz.

11. An optical cavity with a high-reflectivity mirror at one end and a partially transparent mirror at the other end, between which a laser crystal is positioned for an emission of uniform light pulses of precisely defined photon energy, furthermore comprising a polarization rotator and a polarization filter, wherein the polarization rotator is positioned directly adjacent to the partially transparent mirror and is controllable to switch between a first state in which said light pulses are output from the cavity with a first polarization direction, a second state in which said light pulses are output from the cavity with a second polarization direction different from the first polarization direction, and a third state in which no pulses are output from the cavity.

12. The optical cavity according to claim 11, wherein the polarization rotator has a Pockels cell being operated by a high voltage generator which is configured to provide both positive and negative high-voltage pulses of reproducible voltage to switch a polarization direction of the light pulses.

13. The optical cavity according to claim 11, wherein the laser crystal is a birefringent crystal.

14. A time-of-flight mass spectrometer having an ion source which operates with ionization by matrix-assisted laser desorption (MALDI) and comprises an optical cavity according to claim 11.

* * * * *